United States Patent [19]
Schmidt

[11] Patent Number: 5,138,206
[45] Date of Patent: Aug. 11, 1992

[54] METHOD AND APPARATUS FOR COOLING HOT SPOTS IN PLATEN OF LINEAR MOTOR SYSTEM

[75] Inventor: Thomas D. Schmidt, Berwyn, Pa.

[73] Assignee: Megamation Incorporated, Lawrenceville, N.J.

[21] Appl. No.: 709,899

[22] Filed: Jun. 4, 1991

[51] Int. Cl.$^5$ .................... H02K 41/02; H02K 9/00; H02K 1/20
[52] U.S. Cl. .......................................... 310/12; 310/54
[58] Field of Search .................. 310/12, 52, 54, 58, 310/59, 64

[56] References Cited

U.S. PATENT DOCUMENTS

| | | | |
|---|---|---|---|
| 3,704,078 | 11/1972 | Conery et al. | 310/54 |
| 4,115,712 | 9/1978 | Guimbal | 310/12 |
| 4,749,921 | 6/1988 | Chitayat | 310/12 |
| 4,823,062 | 4/1989 | Hoffman et al. | 318/687 |
| 4,839,545 | 6/1989 | Chitayat | 310/12 |
| 4,864,173 | 9/1989 | Even | 310/54 |
| 4,906,878 | 3/1990 | Twaalfhoven et al. | 310/12 |
| 4,916,340 | 4/1990 | Negishi | 310/12 |

FOREIGN PATENT DOCUMENTS

| | | | |
|---|---|---|---|
| 0031517 | 3/1979 | Japan | 310/12 |
| 0118039 | 6/1985 | Japan | 310/12 |
| 0315249 | 12/1989 | Japan | 310/12 |

Primary Examiner—Steven L. Stephan
Assistant Examiner—C. LaBalle
Attorney, Agent, or Firm—Louis Weinstein

[57] ABSTRACT

A ferromagnetic stator employed in a linear motor system is provided with a plurality of internal chambers interconnected to one another for the introduction of coolant to maintain the stator at a uniform temperature and to eliminate hot spots. The compartments are coupled to one another to permit free circulation of the coolant throughout the platen. This circulation is induced by heating of the coolant. Each chamber is connected to the adjacent chamber (or chambers) by at least two sets of openings which respectively provide for communication of hotter and cooler coolant therethrough to facilitate passive cooling. As an alternative, in extreme cases, the coolant may be pumped through the platen compartments by an external pump.

11 Claims, 3 Drawing Sheets

METHOD AND APPARATUS FOR COOLING HOT SPOTS IN PLATEN OF LINEAR MOTOR SYSTEM

FIELD OF THE INVENTION

The present invention relates to stators employed in linear motor systems and the like, and more particularly, to a stator having coolant circulating therethrough to substantially eliminate hot spots.

BACKGROUND OF THE INVENTION

Linear motor systems are well known to the art and typically comprise linear motors, such as, for example, two-dimensional or X-Y linear motors of the type described, for example, in U. S. Pat. No. 4,823,062 issued Apr. 14, 1989. The linear motors typically move along a ferromagnetic stator or platen having a regular grid work of square-shaped teeth arranged in an orthogonal pattern of spaced parallel rows and spaced parallel columns. The linear motor which may, for example, be of the type manufactured by Xynetics Corporation, generates moving electromagnetic fields in mutually perpendicular (X and Y directions) which cooperate with the ferromagnetic working surface of the platen comprised of the aforementioned grid work of teeth to move the linear motor to any desired position along the platen working surface typically to an accuracy which is at least as small as 0.001 inches. The electromagnetic fields passing through the platen generate considerable eddy current heating. In addition, the heating is quite localized causing the development of hot spots. Such uneven heating leads to dimensional degradation of the platen.

It is thus important to provide a platen capable of use with linear motors which may operate continuously for long periods of time while at the same time preventing or substantially eliminating dimensional degradation of the highly accurately machined tooth pattern formed upon the working surface of the platen.

BRIEF DESCRIPTION OF THE INVENTION

The present invention is characterized by comprising a platen structure having a hollow interior portion adjacent the working surface thereof which is divided into a plurality of compartments each separated from the next compartment (or plurality of compartments) by a common barrier wall wherein the barrier walls are provided with communication passageways to induce and promote the flow of coolant therethrough, said coolant being caused to flow due to the development of hot spots wherein the coolant flow serves to even out the temperature across the platen working surface as the coolant seeks temperature equilibrium. The upper and lower communicating passageways serve to respectively direct the higher temperature and lower temperature coolant respectively thereby significantly contributing, together with the individual compartments, to the circulation of the coolant throughout the chambers provided in the platen.

External pumping means may be provided in addition to the passive arrangement in certain extreme circumstances. However, in most applications, uniform heating is achieved without the burden of adding external cooling equipment.

OBJECTS OF THE INVENTION

It is, therefore, one object of the present invention to provide a platen for use in linear motor systems and the like including means for uniformly cooling the platen.

Still another object of the present invention is to provide a novel stator for use in linear motor systems and the like and employing passive cooling means for maintaining a substantially uniform temperature across the working surface of the platen.

Still another object of the present invention is to provide a novel stator for use in linear motor systems and the like and employing passive cooling means for substantially eliminating hot spots which may develop along the working surface of the platen.

Still another object of the present invention is to provide a novel platen for use in linear motor systems and the like in which the platen is provided with internal chambers communicating with one another through coolant passageways which are arranged in such a manner as to promote circulation of the coolant.

DESCRIPTION OF THE FIGURES

The above, as well as other objects of the present invention will become apparent when reading the accompanying description and drawings, in which.

DETAILED DESCRIPTION OF THE INVENTION AND PREFERRED EMBODIMENTS THEREOF

Figure 1:
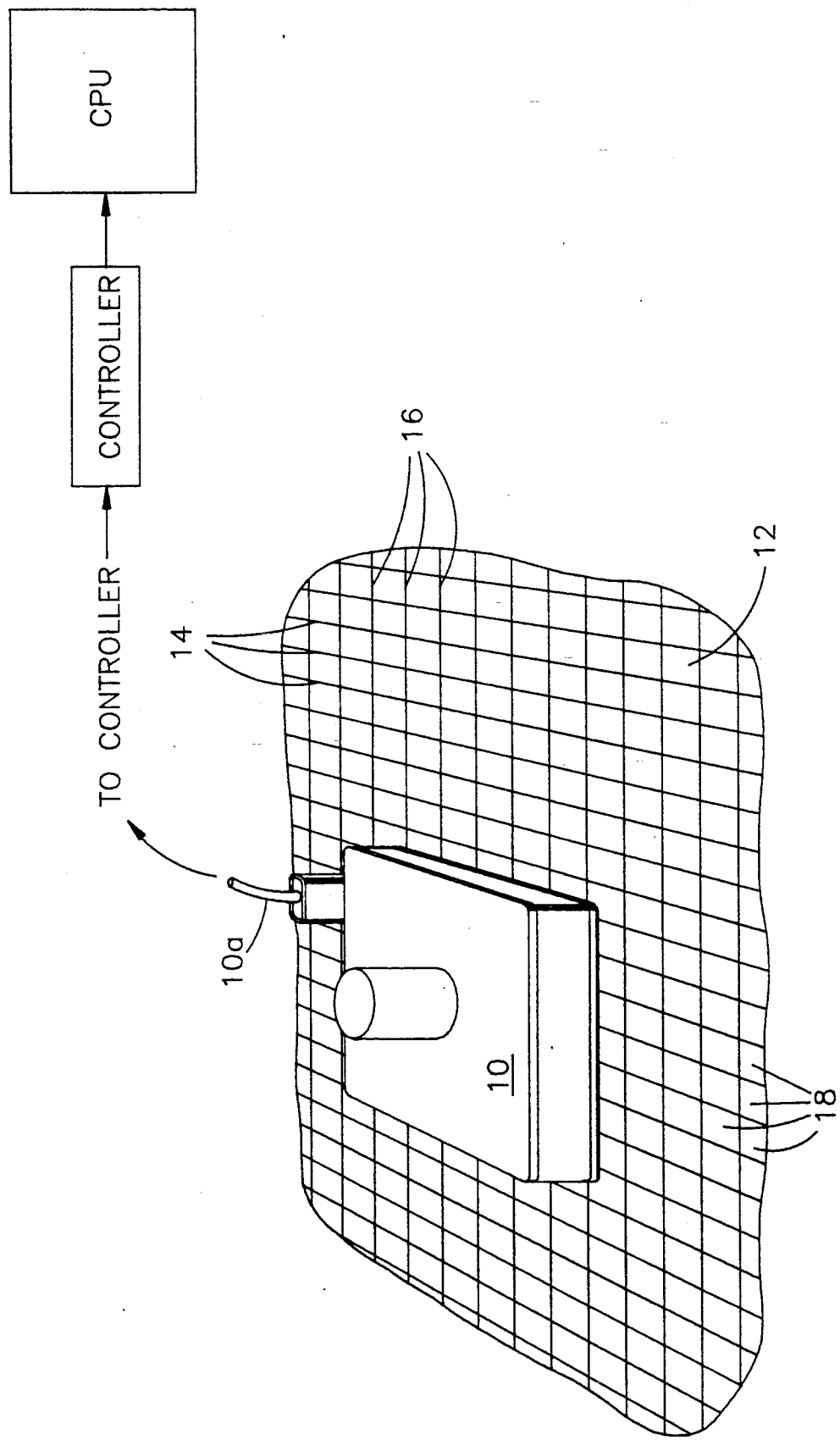
FIG. 1 shows a simplified linear motor system incorporating a stator which may employ the stator configuration of the present invention to great advantage.

FIG. 1 shows a simplified perspective view of a linear motor system comprising a linear motor 10 movable in mutually perpendicular directions along the working surface of a platen 12 having mutually perpendicular sets of grid lines 14 and 16 which are formed or otherwise machined into the platen surface in order to define a regular matrix of teeth 18 which cooperate with mutually perpendicular forcers provided in the linear motor 10 to move the linear motor in a predetermined manner along the surface of platen 12.

Each of the mutually perpendicular forcers provided within linear motor 10 are shown, for example, in greater detail in the aforementioned U. S. Pat. No. 4,823,062, which is incorporated herein by reference thereto, said forcers comprising electromagnets which are driven by sine wave currents that are out of phase with respect to one another in order to move the forcers by one tooth pitch (typically 0.040 inches) each time the drive current is rotated through 360 degrees. The current applied to each forcer is advanced or retarded in discrete steps, typically referred to as "micro steps". Given that there are 400 micro steps per pitch, in one preferred embodiment, the motion is effectively continuous. The teeth 18 of platen 12 are defined by the sets of grid lines or grooves 14 and 16.

Frictionless operation is obtained through the use of a film of air provided between the linear motor 10 and a working surface of platen 12 by the application of air under pressure which is introduced into the linear motor through main cable 10a. The air typically flows out of tiny openings along the bottom surface of the linear motor confronting the surface of platen 12 enabling the linear motor to "float" above the platen. If desired, however, linear bearings may be utilized as an alternative to the film of air.

The command signals provided to the linear motor forcers are generated by the CPU and are provided in the form of position, velocity and acceleration data which is interpreted by a controller 20 for coupling the signals to the forcers of linear motor 10, preferably in the form of analog waveforms.

The linear motor is capable of moving over the platen surface to any position therealong and in any desired projectory. Since the linear motor moves in an irregular pattern, more particularly as a function of the operations desired to be performed, such as, for example, those types of operations utilized in a robotic system such as, for example, the robotic system described in U. S. Pat. No. 4,890,241 issued Dec. 26, 1989 and assigned to the assignee of the present invention, the electromagnetic fields generated by linear motor 10 will pass through certain portions of the ferromagnetic platen material more frequently than other portions and in many instances, the electromagnetic field will not pass through certain portions of the platen working surface throughout a substantially lengthy operating cycle. This mode of operation, although highly desired from the point of view of efficiency and operating speed of the robotic system, nevertheless causes the development of localized heating in those regions of the platen through which the electromagnetic fields pass and, in fact, causes certain regions to develop "hot spots". The non-uniform heating of the platen working surface, which has a highly accurate grid-like pattern of teeth, results in dimensional degradation of the grid-like surface which leads to operational and positional errors whereby the linear motor will not move in the desired manner and/or will not arrive at the precise desired position, due to such localized dimensional deviations.

It is thus important to provide cooling means to reduce and preferably substantially eliminate such hot spots and further to maintain a substantially uniform temperature across the platen working surface to avoid or preferably substantially eliminate such dimensional degradation.

Figure 2:
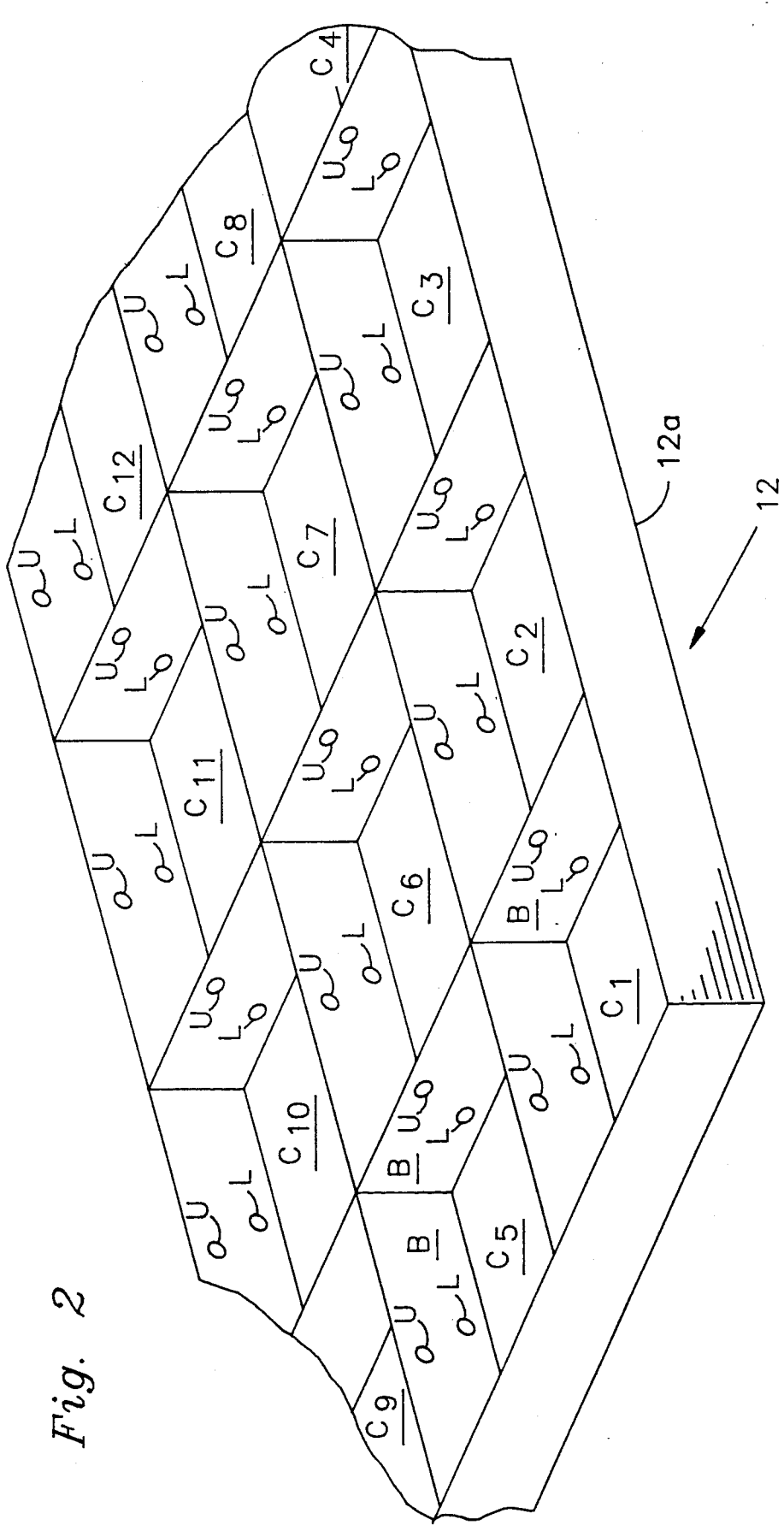
FIG. 2 shows a perspective view of the interior of the stator of the present invention a portion of which has been cut away to facilitate an understanding of the design and operation of the present invention.

FIG. 2 shows an embodiment of the present invention in which a portion of the platen 12 of FIG. 1 has been broken away to show the internal structure provided therein.

Platen 12 is provided with a hollow interior which is divided up into a plurality of compartments Cl through Cn, for example, each compartment being separated from one or more adjacent compartments by the barrier walls B. Each barrier wall is preferably provided with upper and lower coolant passageways U and L.

Coolant is permitted to flow from one neighboring compartment to the next through coolant passageways U and L by natural convection or forced pumping means as will be described in connection with FIG. 3.

In one preferred embodiment shown, for example, in U.S. Pat. No. 4,890,241 issued Dec. 26, 1989 and assigned to the assignee of the present invention, the working surface 12a of the platen faces downwardly in the manner shown in FIG. 2. The compartments are filled with a suitable coolant such as, for example, a mixture of water and any suitable antifreeze coolant. The mixture may range from 20 to 80 percent water and from 80 to 20 percent antifreeze coolant. The preferred mixture proportion is 50 percent water and 50 percent antifreeze coolant. However, any suitable liquid may be used.

The heating of the platen during operation causes the development of "hot spots". The temperature differentials cause circulation of the coolant which seeks temperature equilibrium. The upper passageways allow movement of the higher temperature coolant while the lower passageways allow movement of the lower temperature coolant providing for circulation within each compartment C as well as from compartment to compartment.

The even heating of the platen allows sufficient time for ambient air cooling.

Figure 3:
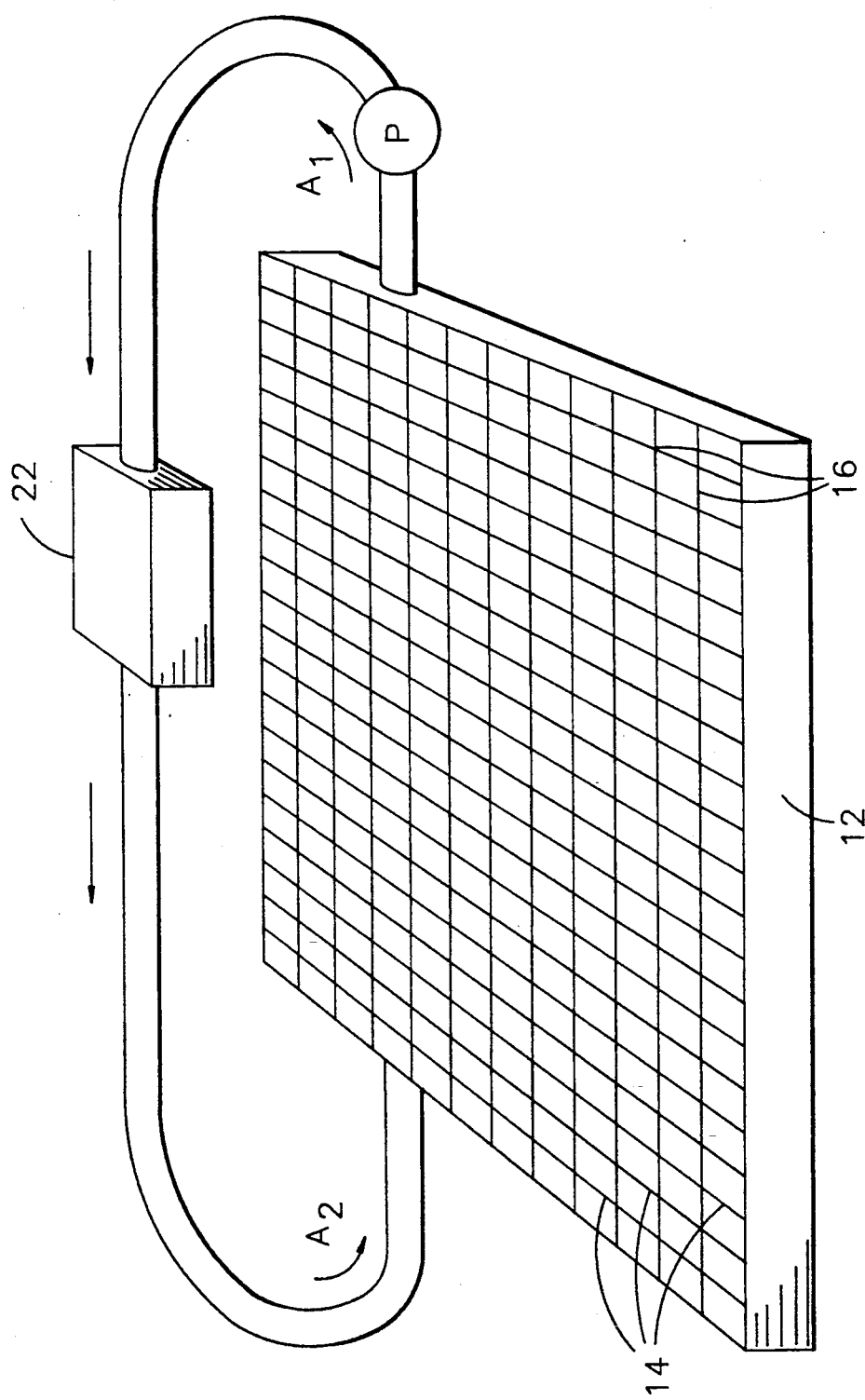
FIG. 3 is a perspective view showing an alternative arrangement of the present invention.

In extreme cases, coolant flow may be assisted by means of an external pump and cooling radiator or other suitable heat exchanger 22 shown in FIG. 3 coupled to opposite ends of platen 12 by conduit 20, the direction of flow being shown by arrows A1 and A2.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A stator for a linear motor system comprising at least one two-dimensional (X—Y) linear motor, said stator comprising:

a substantially unitary member formed of a ferromagnetic material, one surface of said member being substantially planar and having a plurality of teeth arranged in a uniform grid-like pattern and cooperating with dynamic electromagnetic fields generated by said linear motor for moving said linear motor along said stator one surface;

said unitary member having a hollow region adjacent to said one surface, said hollow region being divided into a plurality of compartments by barrier wall means; each compartment being enclosed by a plurality of walls defined by said barrier wall means;

each wall having at least one opening to permit coolant to flow between compartments;

a coolant being provided in said hollow region;

said openings communicating compartments on opposite sides of each of said barrier wall means enabling coolant to flow through each compartment to cool said one surface.

2. The stator of claim 1 wherein said coolant is a fluid coolant.

3. The stator of claim 2 wherein said fluid coolant is a liquid coolant.

4. The stator of claim 3 wherein said liquid coolant includes water.

5. The stator of claim 3 wherein said coolant comprises water and alcohol.

6. The stator of claim 3 wherein said coolant comprises water and an antifreeze coolant.

7. The stator of claim 6 wherein the coolant mixture is between 20 and 80 percent water and between 80 and 20 percent antifreeze coolant.

8. The stator of claim 1 wherein each wall has at least two openings arranged at a higher temperature level so that the coolant flows through one of said openings and coolant at a lower temperature flows through the one of said openings.

9. The stator of claim 8 wherein one of said openings is closer to said one surface and the other one of said openings is further removed from said one surface.

10. The stator of claim 1 further comprising means external to said stator for pumping said coolant through said hollow region in cooperation with passive coolant flow due to the compartment arrangement.

11. The stator of claim 10 further comprising heat exchanger means coupled between said stator and said pump for removing heat from coolant passing through said heat exchanger means.

* * * * *